United States Patent
Hebeisen (10) Patent No.: US 12,392,517 B2
(45) Date of Patent: Aug. 19, 2025

(54) SYSTEMS AND METHODS FOR ENERGY SAVINGS IN BUILDINGS

(71) Applicant: Mechoshade Systems, LLC, Middleton, WI (US)

(72) Inventor: Stephen P. Hebeisen, Amawalk, NY (US)

(73) Assignee: MECHOSHADE SYSTEMS, LLC, Long Island City, NY (US)

( * ) Notice: Subject to any disclaimer, the term of this patent is extended or adjusted under 35 U.S.C. 154(b) by 480 days.

(21) Appl. No.: 17/395,340

(22) Filed: Aug. 5, 2021

(65) Prior Publication Data
US 2022/0042703 A1 Feb. 10, 2022

Related U.S. Application Data

(60) Provisional application No. 63/063,090, filed on Aug. 7, 2020.

(51) Int. Cl.
*F24F 11/35* (2018.01)
*F24F 11/46* (2018.01)
(Continued)

(52) U.S. Cl.
CPC .............. *F24F 11/47* (2018.01); *F24F 11/35* (2018.01); *F24F 11/46* (2018.01); *F24F 11/49* (2018.01);
(Continued)

(58) Field of Classification Search
CPC .. F24F 11/47; F24F 11/35; F24F 11/46; F24F 11/49; F24F 11/74; F24F 2120/10;
(Continued)

(56) References Cited

U.S. PATENT DOCUMENTS 5,050,398 A * 9/1991 Lane ...................... F25D 23/003
62/428
11,333,378 B1 * 5/2022 Limp ...................... G05B 15/02
(Continued)

FOREIGN PATENT DOCUMENTS

CN 212225069 U * 12/2020 ............... E06B 7/08
JP 2580935 Y2 * 9/1998

OTHER PUBLICATIONS

Machine Translation of CN-212225069-U (Year: 2020).*
Masahiro Hirayama, Machine translation of Japanese patent publication JP2580935Y2 (Year: 1998).*

*Primary Examiner* — Kamini S Shah
*Assistant Examiner* — Istiaque Ahmed
(74) *Attorney, Agent, or Firm* — SNELL & WILMER L.L.P.

(57) ABSTRACT

The disclosure includes a method comprising determining that solar heat gain exists in trapped air between a window shade and a window and opening a controllable damper to exhaust the trapped air. The method may also include obtaining occupancy data about an occupant based on at least one of a home automation system or a security system. The method may also include forecasting, using a sky camera and historical sky conditions, sky conditions associated with a building; and determining, based on the forecasted sky conditions, a setting for at least one of a lighting system or an HVAC system associated with the building. The method may also include changing a timing of an automation routine for adjusting window shades to minimize an impact on peak demand energy usage.

23 Claims, 7 Drawing Sheets

(51) Int. Cl.
 *F24F 11/47* (2018.01)
 *F24F 11/49* (2018.01)
 *F24F 11/74* (2018.01)
 *F24F 120/10* (2018.01)
 *F24F 130/10* (2018.01)
(52) U.S. Cl.
 CPC ........... *F24F 11/74* (2018.01); *F24F 2120/10* (2018.01); *F24F 2130/10* (2018.01)
(58) Field of Classification Search
 CPC .. F24F 2130/10; F24F 8/20; F24F 2011/0002; F24F 11/0001; F24F 2221/20; F24F 11/72; F24F 5/0075; Y02A 30/00; Y02B 30/90
 See application file for complete search history.

(56) References Cited

U.S. PATENT DOCUMENTS

| | | | | |
|---|---|---|---|---|
| 2010/0207951 A1* | 8/2010 | Plaisted | ............... | F24D 19/1042 345/473 |
| 2011/0044846 A1* | 2/2011 | McNally | ................ | B01D 46/10 422/4 |
| 2013/0153162 A1* | 6/2013 | Blair | ......................... | E06B 9/32 160/310 |
| 2014/0027069 A1* | 1/2014 | Oppizzi | .................... | E06B 9/40 160/6 |
| 2014/0116497 A1* | 5/2014 | Sanders | .................. | H02S 40/32 136/246 |
| 2014/0190191 A1* | 7/2014 | Slessman | ............ | H05K 7/20309 62/177 |
| 2014/0326428 A1* | 11/2014 | Meirav | ............... | B01D 53/0446 165/59 |
| 2016/0153228 A1* | 6/2016 | Hertz | ..................... | B60J 1/2011 160/181 |
| 2017/0051940 A1* | 2/2017 | Horie | .................... | F24F 1/0047 |
| 2018/0187484 A1* | 7/2018 | Hebeisen | ................. | G05B 17/02 |
| 2018/0266712 A1* | 9/2018 | Plourde | .................... | F24S 90/00 |
| 2019/0063769 A1* | 2/2019 | Hokanson | ............. | F24F 11/0001 |
| 2019/0136618 A1* | 5/2019 | Hebeisen | ............... | H05B 47/11 |
| 2019/0158011 A1* | 5/2019 | West | ....................... | H02S 10/00 |
| 2019/0179275 A1* | 6/2019 | Berman | ............... | G05B 19/042 |
| 2020/0016523 A1* | 1/2020 | Williams | .................. | F24F 3/16 |
| 2020/0041967 A1* | 2/2020 | Shrivastava | ............ | G02F 1/163 |
| 2023/0272928 A1* | 8/2023 | Livchak | .................... | F24F 13/06 422/121 |

* cited by examiner

SYSTEMS AND METHODS FOR ENERGY SAVINGS IN BUILDINGS

CROSS-REFERENCE TO RELATED APPLICATIONS

This application claims the benefit of, and priority to, U.S. Provisional Application Ser. No. 63/063,090 filed on Aug. 7, 2020 and entitled "Systems And Methods For Energy Savings In Buildings," which is hereby incorporated by reference in its entirety for all purposes.

FIELD

The disclosure relates to window shade systems, and more particularly, to enhancing the energy savings in buildings by one or more of using sky forecasting, ventilating window shade pockets and cassettes, using PV fabric to allow the building to store or consume the energy harnessed by the window shades, minimizing power consumption in battery operated window shades and optimizing the integration of window shades with lighting and HVAC (heat, ventilation and air conditioning) systems to mitigate or shift the energy load.

BACKGROUND

Buildings typically use a large amount of energy, so contractors and building owners are always looking for innovative solutions to provide more energy savings in buildings. Industries such as lighting, window shades and HVAC should work together to achieve advanced energy savings. In that regard, certain areas of a building such as the window shades may provide different opportunities to harness or save energy.

Figure 1A:
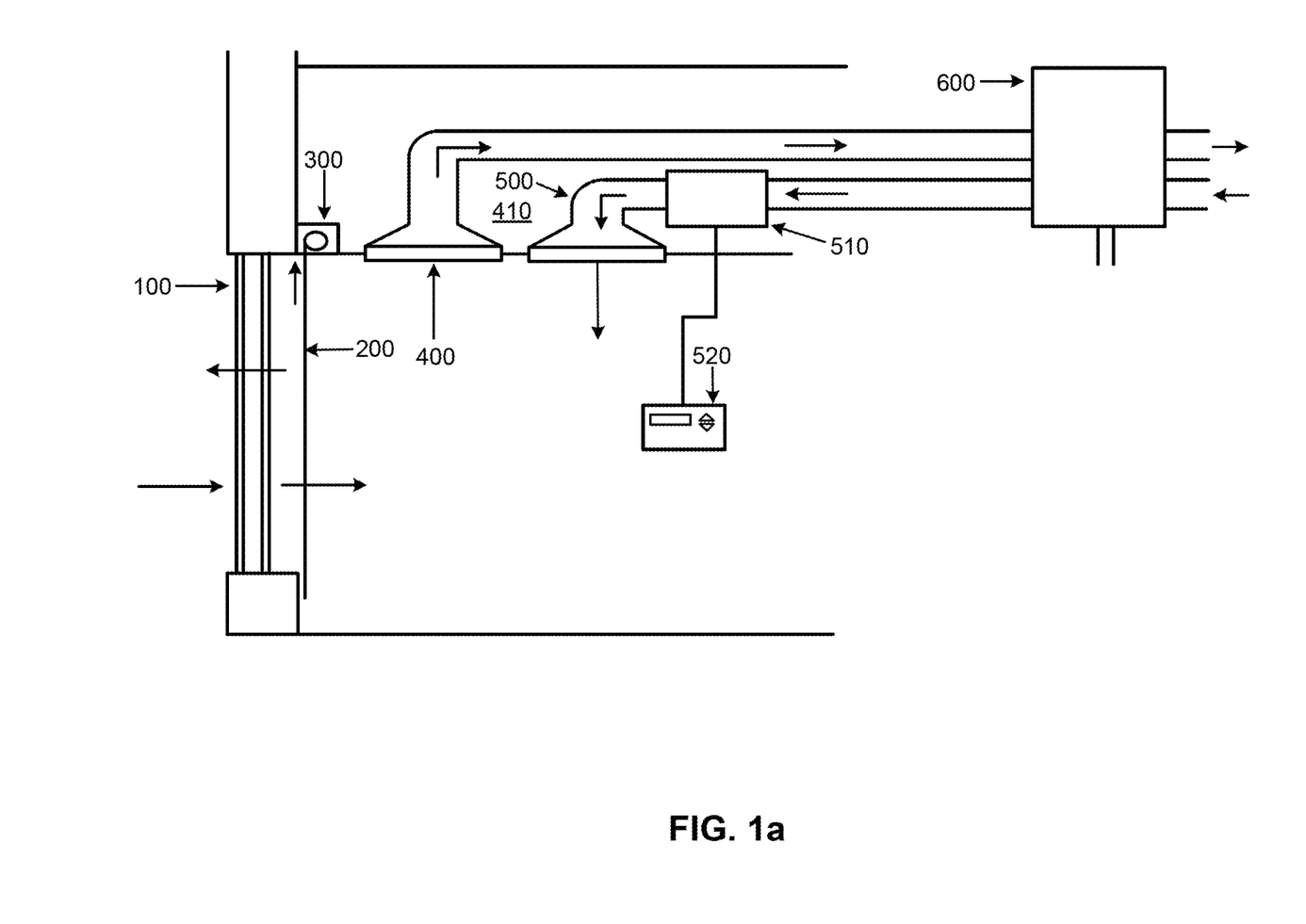
FIGS. 1A and 1B show an exemplary prior art room ventilation system with an AHU 600 or plenum return.
Figure 1B:
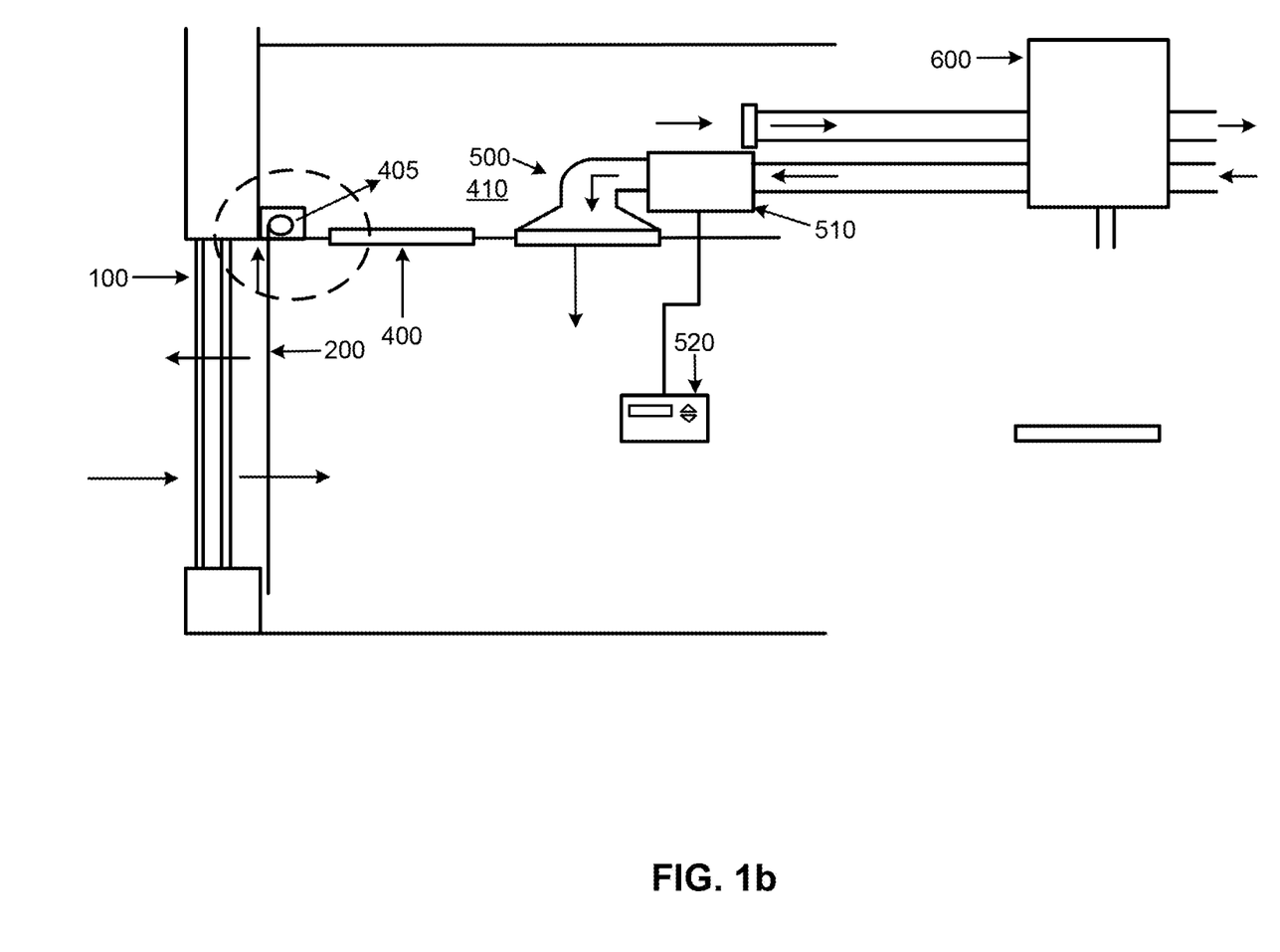
Figure 2:
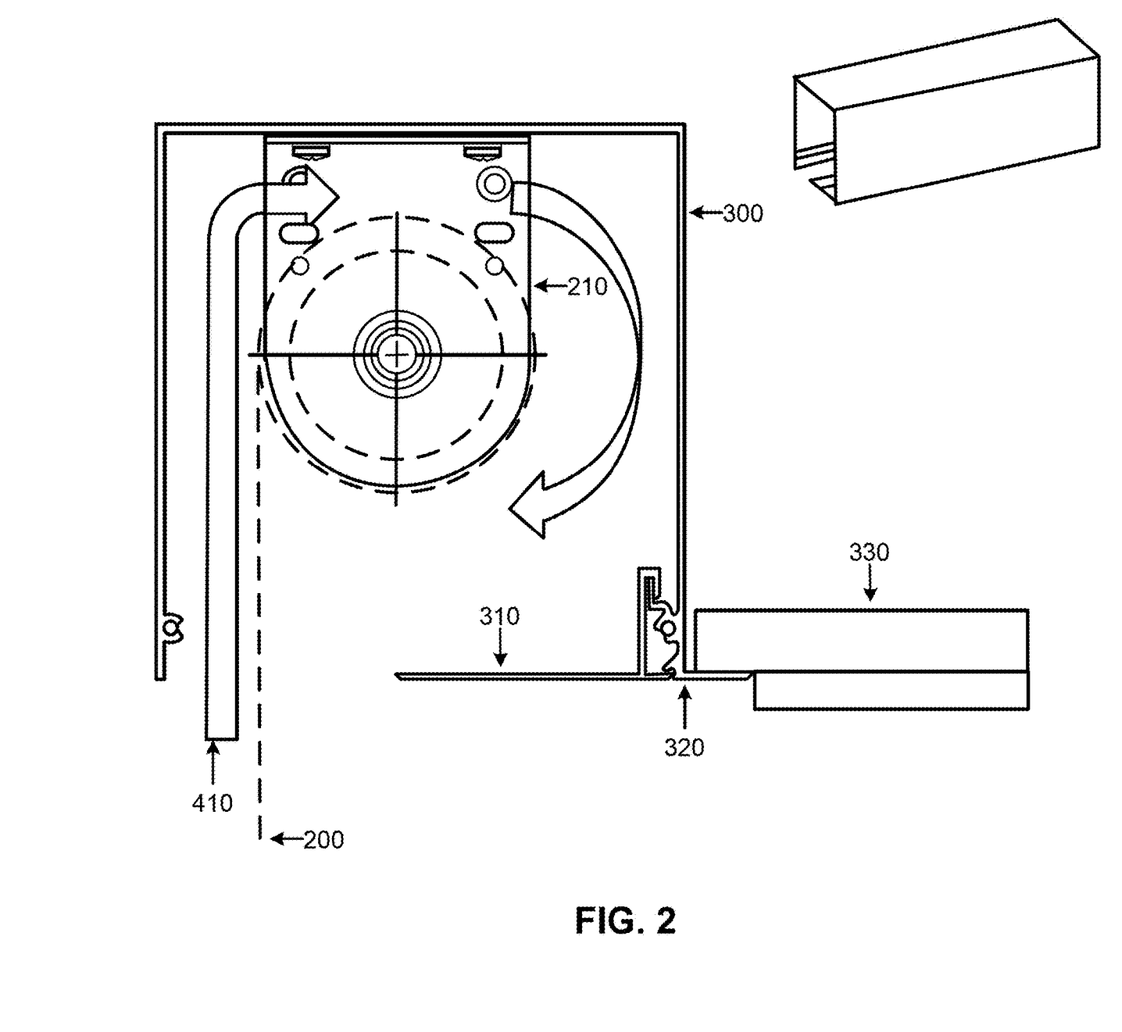
FIG. 2 shows an exemplary prior art window shade pocket 300 where the heat may be trapped in the pocket 300.

For example, as shown in FIGS. 1A and 1B, a space between a window 100 and a window covering (e.g., window shade 200) may experience solar heat gain through conduction of the solar heat from the outside of the window 100 and through the window 100 into such a space. A roller shade in the partially or fully down position may trap some or all of the solar heat gain from the sun in the space. As such, the conduction causes the trapped solar heat gain 410 between the window 100 and the window shade 200 to experience the solar heat gain. Minor losses of the heat may occur from conduction through the window 100 and back to the outside. Minor losses of the heat may also occur from conduction and convection through the window shade 200 and into the room. However, as shown in FIG. 2, the bulk of the solar heat gain that is trapped between the window 100 and the window shade 200 rises into the pocket 300 housing the window shade bracket, and such solar heat gain is not used to save energy. Moreover, the room is typically conditioned with an HVAC system that uses substantial energy, wherein the HVAC system may comprise, for example, an HVAC return 400 (e.g., through ducting or through the plenum), an HVAC supply 500, a Variable Air Volume Terminal (VAV 510), a thermostat 520 to control the VAV 510 and an air handling unit (AHU 600).

SUMMARY

In various embodiments, the system may comprise a window covering (e.g., window shade 200) which may or may not be motorized, a shade pocket 300 (or cassette), a shade pocket return (e.g., vent, duct collar, damper, ductwork), an HVAC air handling unit (AHU 600), and a controller. In various embodiments, the disclosure may include a system and/or method comprising a controller used for determining, by a processor, that solar heat gain 410 exists in trapped air between a window shade 200 and a window 100; and opening, by the processor, a controllable damper to exhaust the trapped solar heat gain 410. The controllable damper may allow the trapped solar heat gain 410 to exit through at least one of a pocket 300 or cassette The controllable damper may allow the trapped solar heat gain 410 to exit from a building.

The trapped solar heat gain 410 may exit into the plenum (e.g., above an acoustical drop ceiling), enter into an AHU 600 and/or travel through a shade pocket return duct to an AHU 600 (e.g., a duct that leads from the pocket 300 to the AHU 600). The shade pocket return duct may connect back into the AHU 600 or other air management system part of the HVAC system for the building. The AHU 600 and/or connected HVAC controller may determine to allow the trapped solar heat gain 410 to exit from a building. Any portion of the controllable damper and/or the air duct (e.g., ventilation line) may include at least one of an antimicrobial or antiviral treatment. The controllable damper 605 and ductwork may allow the trapped solar heat gain 410 to mix with fresh air. The controllable damper 605 may exhaust the trapped solar heat gain 410 back into a building, in response to a temperature of the trapped solar heat gain 410 being within a range that benefits thermal comfort needs or energy management needs for the building. A determination for the at least partially opening or closing of the controllable damper 605 may be based on at least one of historical data, artificial intelligence, real time data or occupant feedback. The method may include closing the controllable damper 605 in response to a fire signal, to restrict the trapped solar heat gain 410 from entering the HVAC system and fueling a fire. The opening of the controllable damper 605 may be based on occupancy data about an occupant from, for example, at least one of a home automation system or a security system.

In various embodiments, the disclosure may include a method comprising obtaining, by the processor, occupancy data about an occupant in a space; determining, by the processor and based on the occupancy data, that the space is occupied by the occupant; adjusting, by the processor, motorized window shades 200 in the pocket 300 for comfort of the occupant. The method may include determining, by processor and based on external weather sensors or connection to a weather service, the real time sky condition, temperature and presence of solar heat gain that is incident on the window 100 or zone that the shade and damper are associated with; adjusting, by the processor, motorized window shade 200s and/or the damper position for comfort or wellness of the occupant and/or building energy savings. The method may also include accessing temperature information outside the building and/or within the pocket 300, by the processor and connection to sensors in the pocket 300; adjusting the damper setting to release trapped heat gain based on configurable thresholds in the controller. The processor (e.g., under the same condition) may decide to modify the position of the shade to capture more or less heat gain and thereby increasing or decreasing the temperature within the pocket 300 respectively. The method may also include obtaining, by the processor, occupancy data about an occupant in a space; determining, by the processor and based on the occupancy data, that the space is unoccupied by the occupant; and adjusting, by the processor, window shade 200s for at least one of energy conservation or carbon footprint reduction. The method may also include, by the processor, accessing the operating mode of the HVAC system including information within the local thermostat 520 to optimize the damper control or motorized shade position.

In various embodiments, the disclosure includes a method comprising forecasting, by the processor using a sky camera and historical sky condition data, sky conditions associated with a building; and determining, by the processor and based on the forecasted sky conditions, a setting for at least one of a lighting system or an HVAC system associated with the building. The method may also include forecasting, by the processor using a sky camera and historical sky condition data, sky conditions associated with a building; and determining, by the processor and based on the forecasted sky conditions, an energy source for the building. The method may also include forecasting, by the processor using a sky camera and historical sky condition data, sky conditions associated with a building, using at least one of artificial intelligence or machine learning.

In various embodiments, the disclosure includes a method comprising changing, by the processor, at least one of a mode of operation or a timing of an automation routine for adjusting window shade 200 positioning to minimize an overall building impact on peak demand energy usage. The method may also include starting, by the processor, an automation routine for adjusting window shades 200 prior to a requested time, to use energy for adjusting prior to peak demand energy usage. The method may also include at least one of minimizing or restricting, by the processor, movement of the window shade 200 to minimize power consumption in a battery powered motor configured to operate the window shade 200, based on predictive information from a sky camera system about future sky conditions. The method may also include determining energy usage from at least one of adjusting lighting settings, adjusting HVAC settings, or activating a window shade 200 motor at a first time; and at least one of adjusting lighting settings, adjusting HVAC settings, or activating a window shade motor at the first time based on minimizing the energy usage. The method may also include transferring, by the processor, energy collected from a solar shade to at least one of a window shade motor or a building power grid. The method may also include capturing, by the processor, at least one of solar energy, thermal energy or kinetic energy from operation of the window shade 200.

BRIEF DESCRIPTION OF DRAWINGS

The features and advantages of the present disclosure will become more apparent from the detailed description set forth below when taken in conjunction with the drawings.

DETAILED DESCRIPTION

Figure 3:
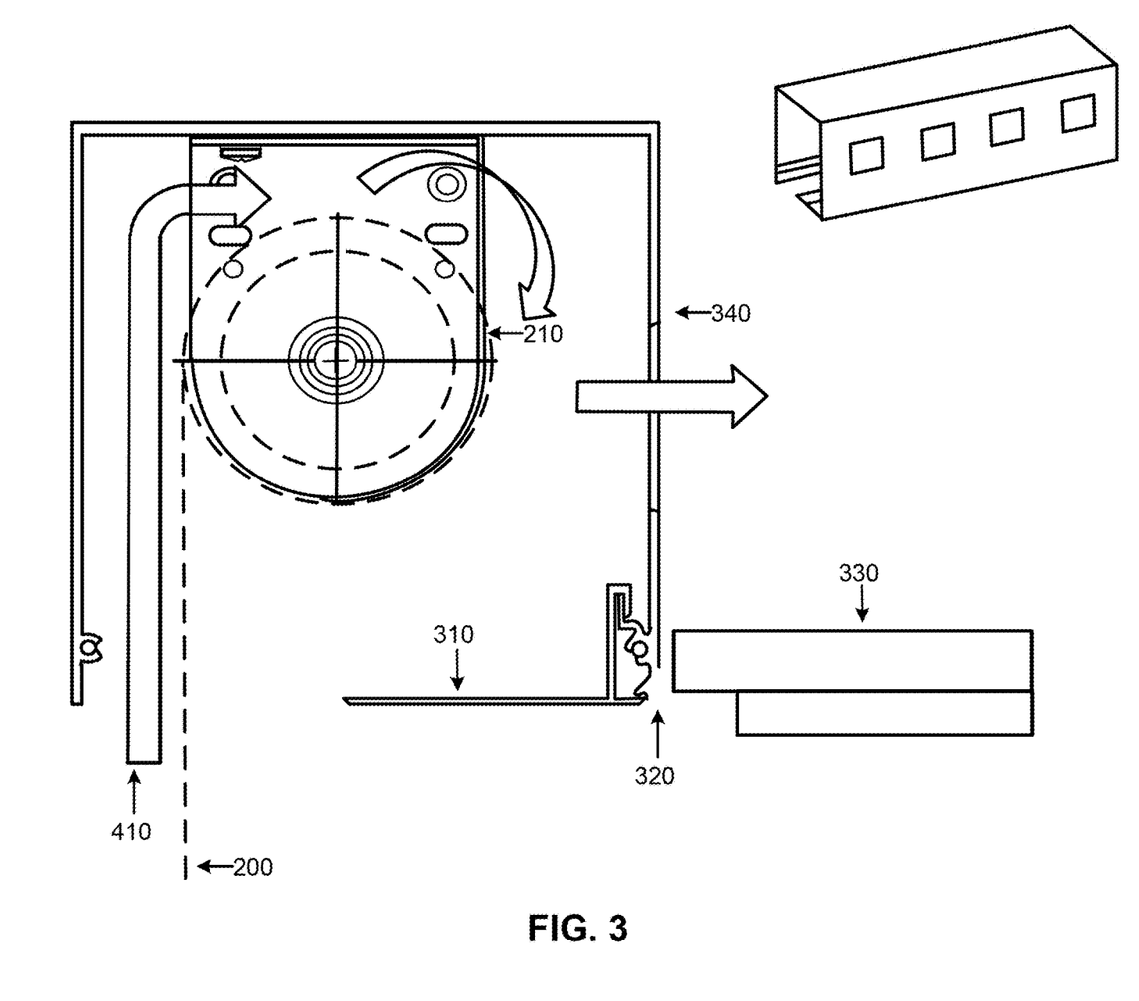
FIG. 3 shows an exemplary window shade pocket 300 with a vent, where the heat gain in the pocket 300 is vented into the plenum return for the HVAC system, in accordance with various embodiments.

In various embodiments, and as shown in FIG. 3, the system may include ventilation of solar heat gain that has collected between the window shade 200 and the window 100, such that the ventilation may exit above that area through, for example, an opening 340 in the pocket 300 and into the HVAC plenum return area or into ductwork (AHU shade return). Pocket 300, as used herein, may refer to a pocket 300, cassette, inlet or any other area that gathers a rolled up window shade 200. The pocket 300 may include any enclosure prefabricated or constructed within the ceiling system for a window covering to be housed within, thereby allowing the fabric or shade material to retract fully within or extend from, in order to cover the window 100. The window shade system may include a mounting bracket 210 that mounts the window shade 200 to the pocket 300. The pocket 300 may include a closure 310 to hide the window shade bracket, and a ceiling tile support 320 to provide support for a part of the ceiling tiles 330 (e.g., acoustical ceiling tiles).

The pocket 300 may include an opening 340 to exhaust the solar heat gain 410 from the pocket. The opening 340 may include a vent, grate, louvres or any other partial covering. The opening 340 may include a damper 605. Damper 605 may be a mechanical damper that is activated or deactivated by air pressure, electrical signals, optical signals or any other means. Damper 605 may be a controllable damper (e.g., first controllable damper) that may communicate with a controller and allow certain control over the exiting of trapped solar heat gain 410, namely heat gain within the pocket 300 that is collected between the window 100 and window shade 200, while direct sunlight impacts the window 100. In that regard, the window shade 200 system may better harness and exhaust solar heat gain from the building to minimize the impact on internal load. The controllable damper 605 may help to regulate the "chimney effect" from the pocket 300 into the return. In particular, the amount of air flow may create a negative pressure at the window shade 200 that pulls the window shade fabric closer into the window 100, as the flow increases. Such friction or interaction between the window shade 200 and window 100 may impact window shade operation. Therefore, controllable damper 605 may be used to vary the flow rate.

The controllable damper 605 may be controlled by a processor (e.g., controller). The controller may obtain any data from any source, and may use such data to determine when to partially or fully open or close the controllable damper. For example, the controller may consider energy information from the internet, social media, occupant feedback, a lighting system, building management system, window shade 200 system, solar tracking system, sky camera system, etc.

Figure 4:
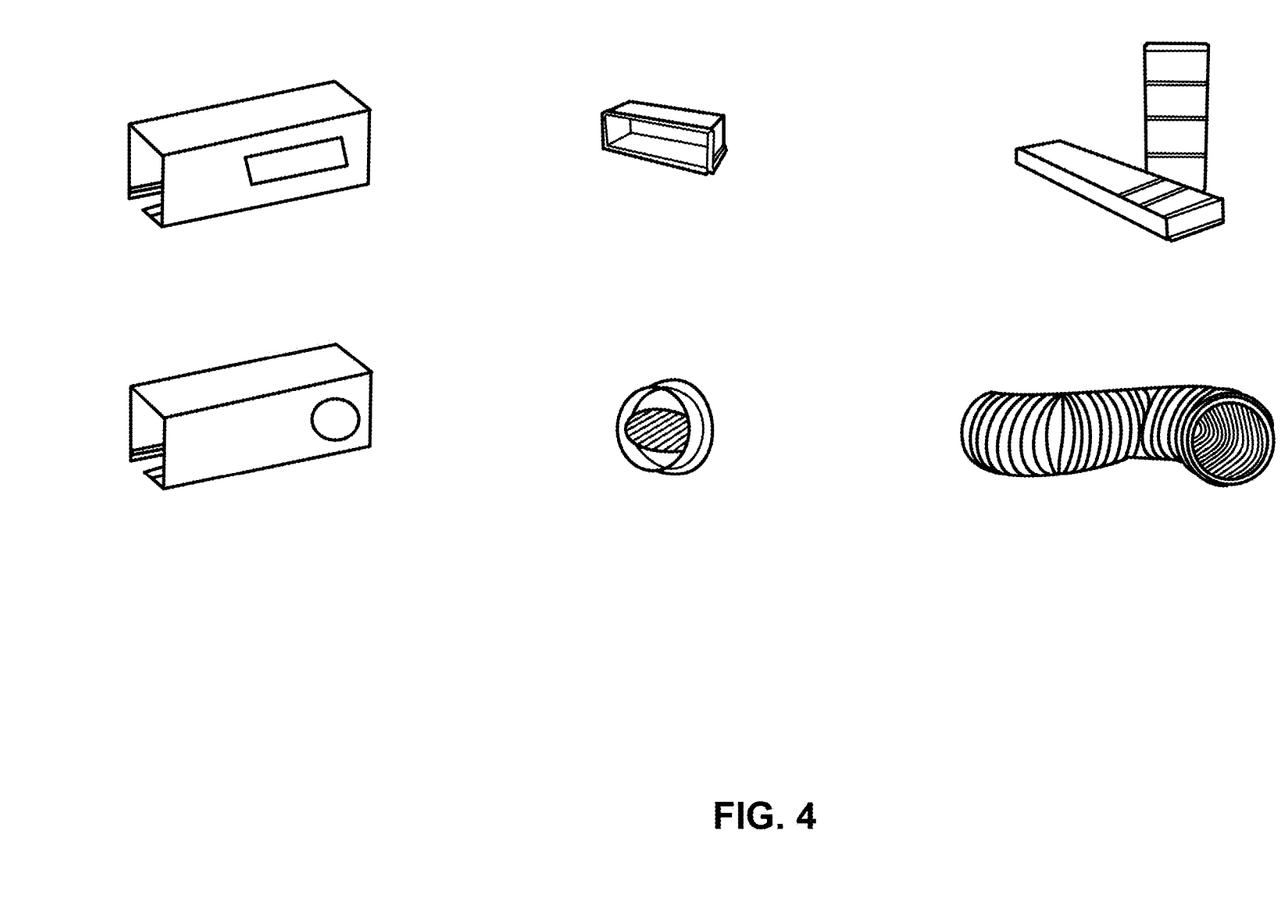
FIG. 4 shows an exemplary ventilation line (e.g., ductwork) that may be connected to the vent in the pocket 300, in accordance with various embodiments.
Figure 5:
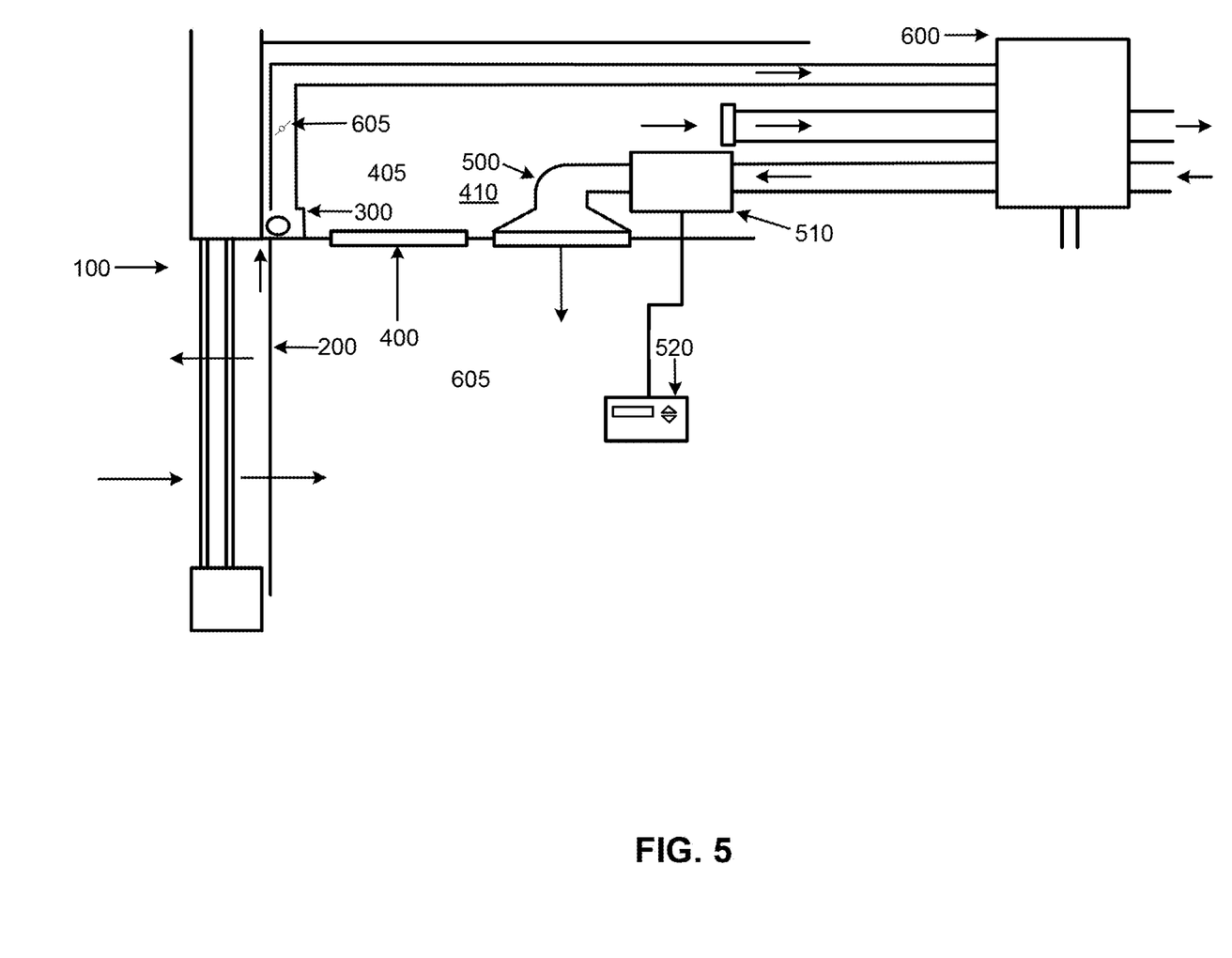
FIG. 5 shows an exemplary air handling unit ventilation system with a shade pocket 300 return duct and controllable damper that may distribute the trapped heat gain from the pocket 300 back to the HVAC AHU 600 for optimized mixing into the exhaust line, fresh air line and connection back to the room or zone environment.

In various embodiments, and as shown in FIGS. 4-5, the vent in the pocket 300 may lead to and/or be attached to ducts (e.g., where a plenum return configuration is not used). The ducting may go to a plenum return or external to the building. This pocket 300 design may be different from the FIG. 3 design because the distribution path of the solar heat gain can be directed to one or more paths via the air handling unit (AHU 600). The AHU 600 may condition fresh air for the supply lines going out to the zones, manage recycling and exhaust return air. This solution also works for both plenum and non-plenum return ceiling conditions.

Cassettes may be configured similar to pocket 300s but typically have the shade system mounted within them by the manufacturer and shipped to the building for installation, as opposed to mounting the shade within a pocket 300 which is installed as part of the building system. Construction is otherwise similar. Ducting may be applied in open ceiling systems as well as wall-mounted shades for punched windows 100 (e.g., windows inset into a wall) that do not integrate with the ceiling. In various embodiments, and as shown in FIG. 5, the duct from the window pocket 300 may lead outside the building as controlled by the AHU 600. In various embodiments, ducting could be setup to be independently controlled. The sending of the hotter trapped solar heat gain 410 outside of the building may be beneficial in the Summer-time. For example, the HVAC system may condition the air in the room with air from the AHU 600. Thus, if the hot air is removed, the HVAC system does not need to cool down such additional hot air as part of a circulation process.

Figure 6:
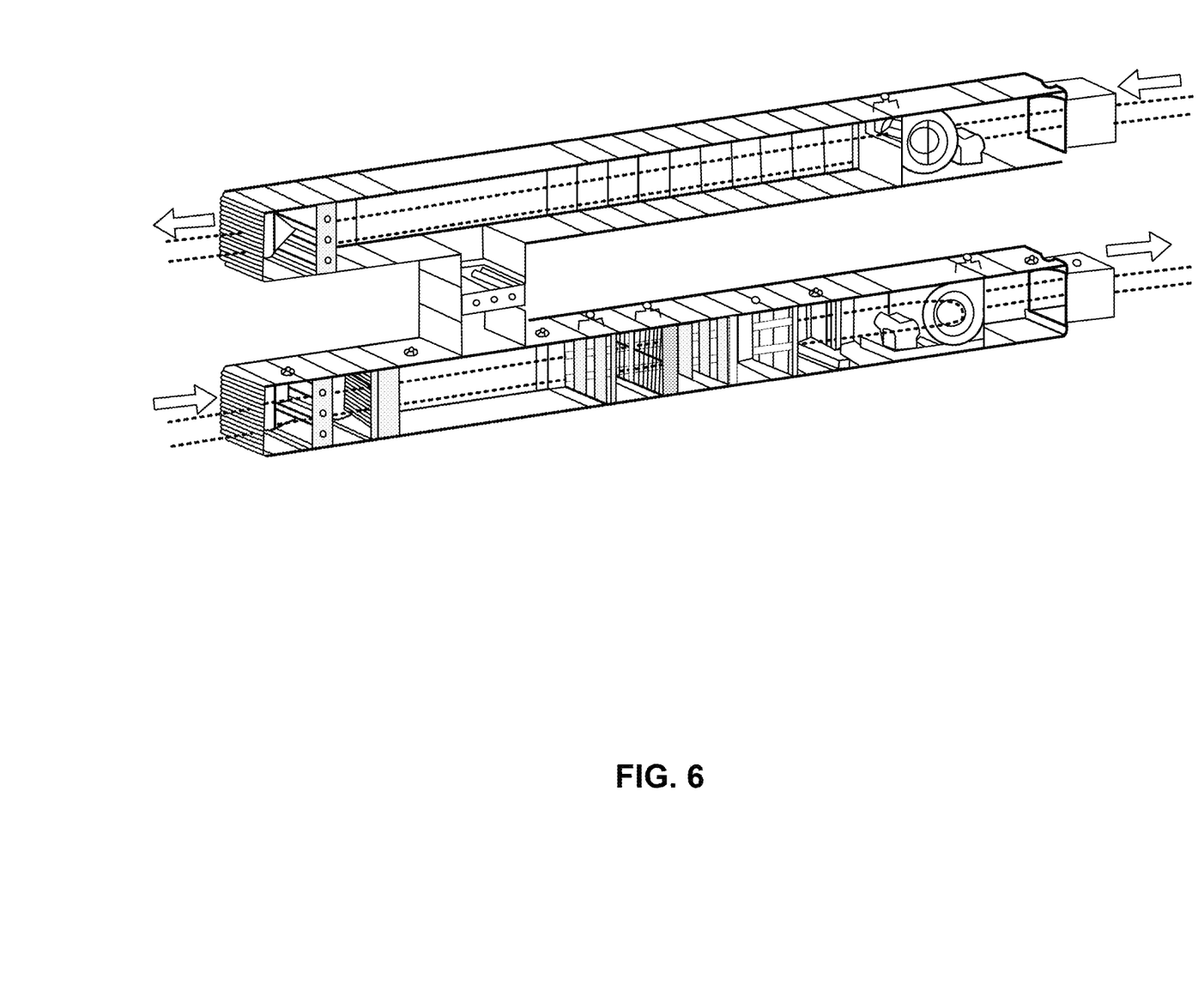
FIG. 6 shows an exemplary air handling unit ventilation system with a controllable damper 605 that mixes the trapped solar heat gain and the fresh air.

In various embodiments, and as also shown in FIG. 5, the duct from the window pocket 300 may also be connected to a fresh air duct through the HVAC system, wherein the fresh air is mixed with the shade return air and reconditioned back into the building environment. As shown in FIG. 6, a controllable damper 605 (e.g., second controllable damper) may also exist within the connection between the duct from the window pocket 300 and the fresh air duct from the HVAC system. Opening of the controllable damper 605 may allow the trapped solar heat gain 410 (which may be at a higher temperature) to mix with the fresh air. Such mixing of the hotter trapped solar heat gain 410 with the fresh air may increase the temperature of the fresh air, without the use of extra energy. Such increasing of the air temperature of the fresh air may be very beneficial in the Winter-time. The mixed supply air may then be pushed into the room to help increase the temperature of the room.

The system may open the controllable damper 605 to exit the trapped solar heat gain 410 (e.g., via a duct) into a building curtainwall. For example, the system may exit the trapped solar heat gain 410 into a thermal buffer between the skins of the double skin façade of the curtainwall. The double skin façade may include an inner insulated glass unit (IGU) and an outer IGU. The curtainwall may include additional tools that can help insulate the building. The curtainwall may include panels that lie flush with the building exterior or extend to admit fresh air. In the Summer, the building façade may remove heat out of the system by deploying horizontal blinds in the cavity, closing the sill damper, and opening the vertical parallel vents on the exterior. The building interior is cooled with a radiant system. The building façade operates as a thermal buffer during Winter months. The BMS closes the inner and outer walls, and the cavity heats up to passively warm the interior, which is also heated by a radiant system. In cold climates, the air buffer works as a barrier to heat loss. Sun-heated air contained in the cavity can heat spaces outside the glass, reducing the demand for indoor heating systems. In hot climates, the cavity can be vented outside the building to mitigate solar gain and decrease the cooling load. Excess heat is drained through a process known as the chimney effect, where differences in air density create a circular motion that causes warmer air to escape. As the air temperature in the cavity rises, it is pushed out, bringing a slight breeze to the surroundings while isolating against heat gain.

Any of the ducting/ventilation discussed herein may comprise any shape, density and/or location. For example, 12 sq inches of ventilation per linear foot is a typical volumetric setpoint that may be employed in the configuration of FIG. 3 which balances flow rates with shade performance. Too much flow can cause a pressure difference that acts to pull a shade toward the curtainwall. This can cause an undesirable aesthetic condition as well as interfere with other natural convection at the curtainwall. Furthermore, it can affect shade operation and any rubbing of the shade fabric on other surfaces can impact life expectancy. Certain adjustable ventilation techniques may be included depending on product selection, product configuration at time of manufacture, product configuration at time of install, product configuration that can be optimized by owner/facilities, and/or product configuration that can self-optimize through intelligent motors, controls and/or automation controllers. Manually adjustable vents and dampers may be setup for configuration during install, while motorized or solenoid driven vents and dampers can be optimized at time of installation and commissioning. These latter solutions may employ AI with feedback from owner/occupant and/or data from the BMS system or building dashboards to help optimize settings, along with algorithm adjustments or shade positioning optimization.

In various embodiments, the system may determine the solar heat gain between the window shade 200 and the window 100 through the use of a temperature sensor placed within or near the area between the window covering and the window 100. For example, the system may include a temperature sensor on the window shade 200 motor, wherein the motor is mounted in the area between the window shade 200 and the window 100 up in the pocket 300 to detect the increase of heat in this area associated with solar heat gain. The solar heat gain may also be forecasted or anticipated by a solar tracking controller for the shade system due to the location of the motor in the building and in relation to the sun's position in the sky. The system may use pocket 300 temperature for other purposes such as optimizing a shade position based on the pocket 300 temperature during key times of the day and/or returning to automation mode from an override condition based on the pocket 300 temperature. For example, an occupant may have overridden the automation mode to allow the room to get hotter than normal. However, the occupant may have subsequently left the room. As such, if the pocket temperature gets too hot, the system may go back into automation mode to control the heat gain.

The venting system may include a treatment. For example, the venting system and ductwork may include a treatment that helps reduce any viruses and microbes (e.g., COVID). The internal mixing of the fresh air (as described above) may also help to purge or dissipate the viruses, while also ventilating the area. In various embodiments, the system may include controllable dampers to the ventilated pocket 300 that can tie into a fire system to prevent smoke distribution and/or air fueling a fire in a plenum or other areas of the building. For example, if the fire system detects smoke, the fire system may send a signal to close the damper to restrict the air from entering the plenum.

The system may incorporate certain models or algorithms for designing the ducting/ventilation into a space/requirement (which may help with the energy savings). Some exemplary factors to consider when designing the ducting/ventilation may include types of glazings, building windowto-wall ratios, locations/climate zones, window/building orientations, types of window coverings, fabric options, frequency of ducting/venting, square footage of window covering between ducts, location/plane of fabric relative to glazing and HVAC system options. The installation conditions may also impact the energy analysis.

In various embodiments, the system may interface with an HVAC that includes a variable air volume (VAV 510) delivery system. The VAV 510 may manage the flow rate and temperature of the supply air to a zone (e.g., a portion of a floor, a room, etc.). A thermostat 520 may control the VAV 510 to regulate the amount and temperature of the supply air to manage comfort (e.g., based on set points). The VAV 510 may maintain the temperature of air volume constant by zone, while varying the volume of air in order to manage thermal conditions in a space. The VAV 510 may include a heater inline to heat the supply air based on thermostat 520 demand. The VAV 510 may also include a damper, so along with the heater, the VAV 510 may control the amount of flow and temperature of the supply air in order to regulate local room thermal comfort relative to the thermostat reading of the actual room temperature and the configured temperature setpoint. As such, VAV 510 systems may allow different zones to operate at different temperatures from the same ventilation system. This may be ideal because not every zone experiences the same heat load or is necessarily used the same way. For example, when the sun is on the east side of the building there is natural heat load impacting that façade, while the west side of the building is in shade. Alternatively, one room may have occupancy and/or lots of heat generating equipment like PCs, while another room is unoccupied and has no heat generating equipment. VAV 510 systems allow individual control of heating or cooling for each room from the same main ductwork and main air handling unit. In that regard, the design of the HVAC and VAV zones and goals can have varying requirements on the amount of ventilation required in the pocket 300 to impact the operations.

With respect to mounting, as set forth in FIG. 4, typical pre-fabricated metal pockets 300 have a variety of accessory options in order to plan venting or ductwork into a building condition. Pockets 300 are typically affixed to building structure by fastening directly to beams or fastening to blocks attached to the beams. In addition, the pockets 300 can also be configured to attach to a structure by way of hanger brackets. The standard pocket 300 may be altered to create a ventilated pocket 300 at the time of manufacture. Pockets 300 may include a variety of sizes, depending on the interface between the curtainwall and building structural design. Most notably, sizes are very dependent on the height of the window covering meant to be housed within the pocket 300. There needs to be sufficient room to get around the window covering which may require different sized tubes or lateral supports based on the width and height of the window covering. In addition, its possible that two shades may be operating in parallel to provide both a cosmetic PV shade solution and a blackout solution generally meant for privacy and/or room darkening requirements for AV presentation needs. Altering the pocket 300 may be based on at least one of outside the window wall-mount condition, inside the window top/jam mount condition, no cost pocket mount condition, gypsum board pocket condition, standard pocket condition and/or ventilated pocket condition.

With respect to the shade assembly, the performance of the shade assembly may be impacted by the assembly conditions. Such assembly conditions may include, for example, without side channels as a standard condition and with side channels as an enhanced condition for containing leakage of energy around the fabric band. In these situations, the pockets 300 often need to be properly treated with light blocking surfaces, finishes and/or textures that prevent the reflection of light up and over a window covering. These features can often be applied on the room side of the path required to support good flow of heat gain into the ventilated or ducted connection to the pocket 300.

With respect to the fabric plane, similar distances from the window 100 should be considered relative to the prior project, but consideration given to the fabric roll direction. Regular roll is the standard application in commercial applications. Regular roll is when the fabric plane rolls up/down closest to the window plane. Reverse Roll is when the fabric plane rolls up/down farthest from window plane. A closure 310 as shown in FIGS. 2 and 3 can be applied to help meet either condition, and can provide a cosmetic way of cleaning up the view of the pocket 300 from the occupant's perspective. This can help hide non-cosmetic bracket components and/or wiring that may otherwise be required inside the pocket 300.

With respect to glazing, consideration should be given to metal framing, thermally broken, double glazed (e.g., 6 mm clear glass, 12.5 mm air gap or 6 mm clear glass, 12.5 mm air gap, low-e coating on surface #2), SolarBan 60 (the most representative of high performance commercial building infrastructure (70% VLT, 0.39 SHGC)), SolarBan 70 (formerly SolarBan 70XL and the most common glass used in new commercial building infrastructure (64% VLT, 0.27 SHGC)) and punched window 100 compared to curtainwall. The glazing characteristics may help determine how energy will travel through the curtainwall system, and ultimately determine the amount of heat gain that may need to be handled by the pocket 300 system. This may dictate design impacts like the size and frequency of venting, the frequency of ductwork, etc. A Low-E coating on the glass especially impacts the ability for infrared (IR) energy to penetrate the glazing coming into the room environment, and also helps to retain radiant heat from escaping the building envelope once inside.

With respect to fabric, consideration should be given to the density of the fabric (e.g., solar/perforated fabric or blackout fabric), the color of the fabric (e.g., dark materials tend to absorb a larger portion of the incident energy than lighter colors) and the material used in the fabric (e.g., metal-based fabrics or louvers do better at reflecting more of the incident energy than non-metallic). For example, Mermet E-Screen which may be 1% openness factor, charcoal/charcoal or 1% openness factor, charcoal/charcoal with KOOLBLACK. The fabric may also include MechoShade EuroTwill 6000 (3%) and 6200 series (1%) modelled with BSDF.

In various embodiments, the system optimizes shade positioning during a utility demand event while also presenting an operation outside of the demand event. For example, when solar heat gain is entering through a window 100 and into a room, the system may adjust certain motorized window shades 200 (on windows facing the sun) that will block the solar heat from entering into a room. In this case, window shades 200 may be positioned to block solar heat gain where the extra heat is not desirable for the occupant. For example, such undesirable heat gain may occur more often in warm climates, seasonal temperate zones, summertime, etc. However, such solar heat gain may be desirable to help offset heating energy in the Winter-time in seasonal temperate zones. Furthermore, heat gain may not be desirable in one area of the building when the sun is on that facade, but may be desirable in other areas of the building which are not exposed to the sun at that time due to solar orientation or shadowing by urban or natural landscape. The system may receive feedback on the external temperature to help determine the optimal shade position or other adjustments in the building systems. The system may also obtain data about occupancy to help a solar tracking system (e.g., may include real-time radiometer readings) engage control strategies for comfort (e.g., solar penetration, glare) when spaces are occupied. The comfort may be based on space utilization and climate zone—major metro location (e.g., open plan, office, conference rooms, cafeteria, and public space usage). The system may include strategies for energy conservation/carbon footprint reduction when spaces are unoccupied. The energy may be based on space utilization and climate zone. For example, in a major metro location, the energy savings may be based on open plan, office, conference rooms, cafeteria, and public space usage. In residential spaces, the system may connect with home automation systems and/or security systems to understand different home control modes like "home", "away", "vacation", etc. The automation may use a scheduler that considers weekday, weekend, seasonal and/or space utilization strategies. The impact of the various automation strategies may include, for example, solar heat gain control, solar tracking, pocket temperature, occupancy, peak vs non-peak energy hour automation, the scheduler, weekday vs weekend settings and/or seasonal.

The system may include solar tracking systems such as the features and functions in, for example, U.S. Ser. No. 14/692,868 which is a continuation of PCT Application No. PCT/US2013/066316 filed on Oct. 23, 2013 and entitled "Automated Shade Control System Utilizing Brightness Modeling". PCT Application No. PCT/US2013/066316 is a continuation of U.S. Ser. No. 13/671,018 filed on Nov. 7, 2012, now U.S. Pat. No. 8,890,456 entitled "Automated Shade Control System Utilizing Brightness Modeling". U.S. Ser. No. 13/671,018 is a continuation-in-part of U.S. Ser. No. 13/556,388 filed on Jul. 24, 2012, now U.S. Pat. No. 8,432,117 entitled "Automated Shade Control System". U.S. Ser. No. 13/556,388 is a continuation of U.S. Ser. No. 13/343,912 filed on Jan. 5, 2012, now U.S. Pat. No. 8,248,014 entitled "Automated Shade Control System". U.S. Ser. No. 14/692,868 is also a continuation-in-part of U.S. Ser. No. 14/461,619 filed on Aug. 18, 2014, now U.S. Pat. No. 9,360,731 entitled "Systems and Methods for Automated Control of Electrochromic Glass." U.S. Ser. No. 14/461,619 is a continuation of U.S. Ser. No. 13/656,401 filed on Oct. 19, 2012, now U.S. Pat. No. 8,836,263 entitled "Automated Shade Control in Connection With Electrochromic Glass". U.S. Ser. No. 13/656,401 is a continuation-in-part of U.S. Ser. No. 13/359,575 filed on Jan. 27, 2012, now U.S. Pat. No. 8,723,467 entitled "Automated Shade Control in Connection with Electrochromic Glass." U.S. Ser. No. 13/359,575 is a continuation-in-part of U.S. Ser. No. 13/343,912 filed on Jan. 5, 2012, now U.S. Pat. No. 8,248,014 entitled "Automated Shade Control System". U.S. Ser. No. 13/343,912 is a continuation of U.S. Ser. No. 12/475,312 filed on May 29, 2009, now U.S. Pat. No. 8,120,292 entitled "Automated Shade Control Reflectance Module". U.S. Ser. No. 12/475,312 is a continuation-in-part of U.S. Ser. No. 12/421,410 filed on Apr. 9, 2009, now U.S. Pat. No. 8,125,172 entitled "Automated Shade Control Method and System". U.S. Ser. No. 12/421,410 is a continuation-in-part of U.S. Ser. No. 12/197,863 filed on Aug. 25, 2008, now U.S. Pat. No. 7,977,904 entitled "Automated Shade Control Method and System." U.S. Ser. No. 12/197,863 is a continuation-in-part of U.S. Ser. No. 11/162,377 filed on Sep. 8, 2005, now U.S. Pat. No. 7,417,397 entitled "Automated Shade Control Method and System." U.S. Ser. No. 11/162,377 is a continuation-in-part of U.S. Ser. No. 10/906,817 filed on Mar. 8, 2005 and entitled "Automated Shade Control Method and System." U.S. Ser. No. 10/906,817 is a nonprovisional of U.S. Provisional No. 60/521,497 filed on May 6, 2004 and entitled "Automated Shade Control Method and System." The entire contents of all of the foregoing applications are hereby incorporated by reference for all purposes.

In various embodiments, the system may include a sky camera system that may provide sky forecasting. Any of the sky forecasting operations may be conducted or enhanced by artificial intelligence (AI) or machine learning. AI may refer generally to the study of agents (e.g., machines, computer-based systems, etc.) that perceive the world around them, form plans, and make decisions to achieve their goals. Foundations of AI may include mathematics, logic, philosophy, probability, linguistics, neuroscience, and decision theory. Many fields fall under the umbrella of AI, such as computer vision, robotics, machine learning, and natural language processing.

Sky forecasting may contribute to optimizing the use of the solar heat gain 410 or the settings for other building systems (e.g., lighting, electrochromic windows and HVAC) based on existing conditions and future conditions. Sky forecasting may also contribute to identifying the optimal energy resource such as the availability of using passive energy options based on the availability of optimal environmental conditions (e.g., sky transparency, sky condition, wind speed, etc.) for buildings equipped with options onsite, remote or via utility to employ solar, wind, coal, nuclear, etc. Sky forecasting may work in tandem with such options to validate the opportunity and quality of charging and to identify when the energy source will be capable of offsetting internal demand and to what extent. The sky camera system may incorporate any of the feature or functions set forth in U.S. Ser. No. 16/849,834, which is hereby incorporated by reference in its entirety for all purposes. The '834 application is a continuation-in-part of U.S. Ser. No. 16/240,479 filed on Jan. 4, 2019 and entitled "Sky Camera System Utilizing Circadian Information For Intelligent Building Control." U.S. Ser. No. 16/240,479 is a continuation-in-part of U.S. Ser. No. 15/906,674 filed on Feb. 27, 2018 and entitled "Sky Camera System for Intelligent Building Control". U.S. Ser. No. 15/906,674 is a non-provisional of, and claims priority to, U.S. Provisional Patent Application Ser. No. 62/513,733 filed on Jun. 1, 2017 and entitled "Sky Camera System for Intelligent Building Control." U.S. Ser. No. 15/906,674 is also a continuation-in-part of U.S. Ser. No. 14/692,868 filed on Apr. 22, 2015, now U.S. Pat. No. 9,938,765 entitled "Automated Shade Control System Interaction with Building Management System." The entire contents of all of the foregoing applications are hereby incorporated by reference for all purposes.

In various embodiments, the system may optimize automation routines to supplement energy storage for a building to help offset peak demand and extend the use of the power base. For example, the system may limit or restrict window shade 200 movements during peak energy demand times. The system may also move the window shades 200 prior to the need to move the window shades 200 to avoid the peak demand times that may exist an hour later. For example, the system may determine that solar heat gain may increase in an hour. However, the system may also determine that peak demand and higher energy costs may exist in an hour.

Therefore, the system may, at the current time, adjust the window shades 200 on certain windows 100 (i.e., windows that may experience the solar heat gain in an hour), such that the window shades 200 are in an optimum position to block or capture the solar heat gain that will arrive in an hour.

In various embodiments, the system may include battery operated motors that control the window shades 200. The system may optimize shade movement to minimize power consumption in the battery powered motors. Sky cameras can play a role in minimizing shade movement to reduce power needs based on determining existing sky conditions and future sky conditions. For example, the system may determine that a particular window 100 is experiencing increasing solar radiation, so the system may instruct the battery powered motor to lower the window shade 200 over that window 100. However, a sky camera system may determine that that window 100 may be impacted by clouds in the next 15 minutes, so the sky camera system may instruct the window management system to override the typical command to lower the window shade 200. Instead, the system may avoid activating the motor and avoid movement by keeping the window shade 200 up for a few extra minutes until the clouds appear.

In various embodiments, the system may include internally optimizing battery management or energy demand by optimizing lighting usage and minimizing window shade 200 adjustments, based on future sky conditions, weather data and/or limits based on a BTU threshold (on/off). Optimized integration of window shades 200 with lights and HVAC may help mitigate and/or shift load for energy reasons, while still optimizing for comfort. Such optimization is not limited to just the setting of shades at a certain level, but rather, coordinating the movement of the window shades 200 (e.g., based on window 100 orientations) with third party systems for lighting and HVAC settings. For example, the system may determine that the clouds may appear and a window 100 may experience decreased solar load in the next 5 minutes. The system may work with the BMS to provide the forecasted sky condition and determine how much energy may be needed (or saved) to increase the HVAC settings, activate the motor to raise the window shades 200 and lower the lighting in a particular region of the building. Based on the optimal energy saving or minimal energy needs, the system may determine the optimal full or partial adjustment of the various systems.

In various embodiments, the system may include photovoltaic (PV) fabric. To harness energy, the PV fabric may be comprised of, for example, blackout shades welded to flexible PV cells. For cosmetic purposes, the system may include a dual shade such that the solar shade faces the outside and an aesthetically pleasing shade faces the inside. The dual shades may move at the same time, such that the occupant does not see the solar shade. The system may also include a fabric made with photovoltaic materials. The system may transfer power from the PV fabric to the motor inside the shade tube to provide energy to the shade system. The window shade system may integrate with a power grid for the building, such that the power grid may store/consume the energy that the shades may harness. In particular, the system may bring the power off the motor and shade system to the building which is connected to the building power grid. The solar shade may harness energy from the sunlight and the window shade system may harness kinetic energy from the operation of the window shade roller, motor, etc. Kinetic energy may be captured by placing an unpowered motor assembly represented by a coil and magnet within the idle end of the shade. As the tube rotates, the armature rotates with respect to the coils thus generating electricity that can then be harnessed by a capacitor or battery system connected across the coils.

The detailed description of exemplary embodiments herein makes reference to the accompanying drawings, which show exemplary embodiments by way of illustration and its best mode, and not of limitation. While these exemplary embodiments are described in sufficient detail to enable those skilled in the art to practice the invention, it should be understood that other embodiments may be realized and that logical, chemical and mechanical changes may be made without departing from the spirit and scope of the invention. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Systems and methods are provided. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Any databases discussed herein may include relational, hierarchical, graphical, blockchain, object-oriented structure, and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2® by IBM® (Armonk, NY), various database products available from ORACLE® Corporation (Redwood Shores, CA), MICROSOFT ACCESS® or MICROSOFT SQL SERVER® by MICROSOFT® Corporation (Redmond, Washington), MYSQL® by MySQL AB (Uppsala, Sweden), MONGODB®, Redis, APACHE CASSANDRA®, HBASE® by APACHE®, MapR-DB by the MAPR® corporation, or any other suitable database product. Moreover, any database may be organized in any suitable manner, for example, as data tables or lookup tables. Each record may be a single file, a series of files, a linked series of data fields, or any other data structure.

As used herein, big data may refer to partially or fully structured, semi-structured, or unstructured data sets including millions of rows and hundreds of thousands of columns. A big data set may be compiled, for example, from a history of purchase transactions over time, from web registrations, from social media, from records of charge (ROC), from summaries of charges (SOC), from internal data, or from other suitable sources. Big data sets may be compiled without descriptive metadata such as column types, counts, percentiles, or other interpretive-aid data points.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); data stored as Binary Large Object (BLOB); data stored as ungrouped data elements encoded using ISO/IEC 7816-6 data elements; data stored as ungrouped data elements encoded using ISO/IEC Abstract Syntax Notation (ASN.1) as in ISO/IEC 8824 and 8825; other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with the system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user, or the like. Furthermore, the security information may restrict/permit only certain actions, such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer, may be received by a standalone interaction device configured to add, delete, modify, or augment the data in accordance with the header or trailer. As such, in one embodiment, the header or trailer is not stored on the transaction device along with the associated issuer-owned data, but instead the appropriate action may be taken by providing to the user, at the standalone device, the appropriate option for the action to be taken. The system may contemplate a data storage arrangement wherein the header or trailer, or header or trailer history, of the data is stored on the system, device or transaction instrument in relation to the appropriate data.

One skilled in the art will also appreciate that, for security reasons, any databases, systems, devices, servers, or other components of the system may consist of any combination thereof at a single location or at multiple locations, wherein each database or system includes any of various suitable security features, such as firewalls, access codes, encryption, decryption, compression, decompression, and/or the like.

Practitioners will also appreciate that there are a number of methods for displaying data within a browser-based document. Data may be represented as standard text or within a fixed list, scrollable list, drop-down list, editable text field, fixed text field, pop-up window, and the like.

Likewise, there are a number of methods available for modifying data in a web page such as, for example, free text entry using a keyboard, selection of menu items, check boxes, option boxes, and the like.

The data may be big data that is processed by a distributed computing cluster. The distributed computing cluster may be, for example, a HADOOP® software cluster configured to process and store big data sets with some of nodes comprising a distributed storage system and some of nodes comprising a distributed processing system. In that regard, distributed computing cluster may be configured to support a HADOOP® software distributed file system (HDFS) as specified by the Apache Software Foundation at www.hadoop.apache.org/docs.

As used herein, the term "network" includes any cloud, cloud computing system, or electronic communications system or method which incorporates hardware and/or software components. Communication among the parties may be accomplished through any suitable communication channels, such as, for example, a telephone network, an extranet, an intranet, internet, point of interaction device (point of sale device, personal digital assistant (e.g., an IPHONE® device, a BLACKBERRY® device), cellular phone, kiosk, etc.), online communications, satellite communications, off-line communications, wireless communications, transponder communications, local area network (LAN), wide area network (WAN), virtual private network (VPN), networked or linked devices, keyboard, mouse, and/or any suitable communication or data input modality. Moreover, although the system is frequently described herein as being implemented with TCP/IP communications protocols, the system may also be implemented using IPX, APPLETALK® program, IP-6, NetBIOS, OSI, any tunneling protocol (e.g. IPsec, SSH, etc.), or any number of existing or future protocols. If the network is in the nature of a public network, such as the internet, it may be advantageous to presume the network to be insecure and open to eavesdroppers. Specific information related to the protocols, standards, and application software utilized in connection with the internet is generally known to those skilled in the art and, as such, need not be detailed herein.

"Cloud" or "Cloud computing" includes a model for enabling convenient, on-demand network access to a shared pool of configurable computing resources (e.g., networks, servers, storage, applications, and services) that can be rapidly provisioned and released with minimal management effort or service provider interaction. Cloud computing may include location-independent computing, whereby shared servers provide resources, software, and data to computers and other devices on demand.

As used herein, "transmit" may include sending electronic data from one system component to another over a network connection. Additionally, as used herein, "data" may include encompassing information such as commands, queries, files, data for storage, and the like in digital or any other form.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus-based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a HYPERLEDGER® Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the system may also reduce database synchronization errors by providing a common data structure, thus at least partially improving the integrity of stored data. The system also offers increased reliability and fault tolerance over traditional databases (e.g., relational databases, distributed databases, etc.) as each node operates with a full copy of the stored data, thus at least partially reducing downtime due to localized network outages and hardware failures. The system may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network.

The particular blockchain implementation described herein provides improvements over conventional technology by using a decentralized database and improved processing environments. In particular, the blockchain implementation improves computer performance by, for example, leveraging decentralized resources (e.g., lower latency). The distributed computational resources improves computer performance by, for example, reducing processing times. Furthermore, the distributed computational resources improves computer performance by improving security using, for example, cryptographic protocols.

Any communication, transmission, and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website, mobile application, or device (e.g., FACEBOOK®, YOUTUBE®, PANDORA®, APPLE TV®, MICROSOFT® XBOX®, ROKU®, AMAZON FIRE®, GOOGLE CHROMECAST™, SONY® PLAYSTATION®, NINTENDO® SWITCH®, etc.) a uniform resource locator ("URL"), a document (e.g., a MICROSOFT® Word or EXCEL™, an ADOBE® Portable Document Format (PDF) document, etc.), an "ebook," an "emagazine," an application or microapplication (as described herein), an short message service (SMS) or other type of text message, an email, a FACEBOOK® message, a TWITTER® tweet, multimedia messaging services (MMS), and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network, and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, LINKEDIN®, INSTAGRAM®, PINTEREST®, TUMBLR®, REDDIT®, SNAPCHAT®, WHATSAPP®, FLICKR®, VK®, QZONE®, WECHAT®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the invention. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A method comprising:
adjusting a roller shade over an inside surface of a window to optimize solar heat gain between the inside surface of the window and the roller shade;
receiving the solar heat gain through the window and into a window pocket between the inside surface of the window and the roller shade;
receiving the solar heat gain into trapped air in the window pocket between the inside surface of the window and the roller shade;
determining, by a processor, that the solar heat gain exists in the trapped air in the window pocket between the inside surface of the window and the roller shade,
wherein the roller shade at least partially covers the inside surface of the window, and
wherein the roller shade is mounted in at least one of a pocket or a cassette over a room; and
opening, by the processor, a controllable damper located within a first duct that leads from the window pocket to a fresh air duct, based on at least one of historical data, artificial intelligence or occupant feedback,
wherein the opening the controllable damper exhausts air with the solar heat gain from the trapped air from the first duct and into a second duct with fresh air emanating from a heat, ventilation and air conditioning (HVAC) system, and
wherein a mixture of the air with the solar heat gain and the fresh air directly enters a room.

2. The method of claim 1, wherein the controllable damper allows the trapped air to exit from at least one of a pocket or cassette.

3. The method of claim 1, wherein the air with the solar heat gain from the trapped air is exhausted through the controllable damper.

4. The method of claim 1, wherein a determination for the opening of the controllable damper is based on at least one of a temperature reading from a temperature sensor in at least one of the pocket or the cassette, or a temperature reading from a temperature sensor on a window shade motor.

5. The method of claim 1, wherein the controllable damper also leads to at least one of a ventilation line, an air handling unit (AHU) return, an AHU shade return, a fresh air duct or a curtainwall.

6. The method of claim 1, wherein the controllable damper also leads to a ventilation line that includes at least one of an antimicrobial or antiviral treatment.

7. The method of claim 1, further comprising opening, by the processor, a second controllable damper that allows the trapped air to mix with an air return duct.

8. The method of claim 1, wherein the opening the controllable damper to exhaust the air with the solar heat gain from the trapped air also includes exhausting a portion of the air with the solar heat gain from trapped air back into a building, in response to a temperature of the trapped air being within a range of thermal comfort needs for the building.

9. The method of claim 1, further comprising closing, by the processor, the controllable damper in response to a fire signal, to restrict the air with the solar heat gain from the trapped air from entering the second duct.

10. The method of claim 1, wherein the opening the controllable damper is based on forecasting the solar heat gain using a solar tracking system.

11. The method of claim 1, wherein the opening the controllable damper is based on occupancy data about an occupant from at least one of a home automation system or a security system.

12. The method of claim 1, further comprising:
obtaining, by the processor, occupancy data about an occupant in a space;
determining, by the processor and based on the occupancy data, that the space is occupied by the occupant; and
adjusting, by the processor, the controllable damper for comfort of the occupant.

13. The method of claim 1, further comprising:
determining, by the processor and based on the occupancy data, that the space is unoccupied by the occupant; and
adjusting, by the processor, the controllable damper for at least one of energy conservation or carbon footprint reduction.

14. The method of claim 1, further comprising:
forecasting, by the processor using a sky camera and historical sky condition data, sky conditions associated with a building; and
determining, by the processor and based on the forecasted sky conditions, a setting for at least one of a lighting system or the HVAC system associated with the building.

15. The method of claim 1, further comprising:
determining, by the processor and based on the forecasted sky conditions, an energy source for the building.

16. The method of claim 1, further comprising forecasting using at least one of artificial intelligence or machine learning.

17. The method of claim 1, further comprising changing, by the processor, at least one of a mode of operation or a timing of an automation routine for adjusting the roller shade positioning to minimize an overall building impact on peak demand energy usage.

18. The method of claim 1, further comprising starting, by the processor, an automation routine for adjusting the roller shade prior to a requested time, to use energy for the adjusting prior to peak demand energy usage.

19. The method of claim 1, further comprising at least one of minimizing or restricting, by the processor, movement of the roller shade to minimize power consumption in a battery powered motor configured to operate the roller shade, based on predictive information from a sky camera system about future sky conditions.

20. The method of claim 1, further comprising:
determining energy usage from at least one of adjusting lighting settings, adjusting HVAC settings, or activating a motor that operates the roller shade at a first time; and
at least one of the adjusting lighting settings, the adjusting HVAC settings, or the activating the motor at the first time based on minimizing the energy usage.

21. The method of claim 1, further comprising transferring, by the processor, energy collected from a solar shade that is part of the roller shade to at least one of a motor that activates the roller shade or a building power grid.

22. The method of claim 1, further comprising capturing, by the processor, at least one of solar energy, thermal energy or kinetic energy from operation of the roller shade.

23. A system comprising:
a roller shade,
wherein the roller shade at least partially covers the inside surface of a window;
the roller shade is configured to adjust over the inside surface of the window to optimize solar heat gain between the inside surface of the window and the roller shade;
the window is configured to receive the solar heat gain through the window and into a window pocket between an inside surface of the window and the roller shade;
the window pocket configured to receive the solar heat gain into trapped air in the window pocket between the inside surface of the window and the roller shade;
at least one of a pocket or a cassette housing a bracket for the roller shade; and
a controllable damper located within a first duct that leads from the window pocket to a fresh air duct,
wherein, based on at least one of historical data, artificial intelligence or occupant feedback, the controllable damper is configured to open to exhaust air with the solar heat gain from the trapped air from the first duct and into a second duct with fresh air emanating from a heating, venting and air conditioning (HVAC) system, and
wherein a mixture of the air with the solar heat gain and the fresh air directly enters a room.

* * * * *